United States Patent Office 3,194,681

Patented July 13, 1965

3,194,681
PROCESS FOR PLATING THROUGH HOLES IN A DIELECTRIC MATERIAL

Richard J. Nicholson and Robert P. Williams, Dayton, Ohio, assignors to The National Cash Register Company, Dayton, Ohio, a corporation of Maryland No Drawing. Filed Dec. 22, 1960, Ser. No. 77,489
5 Claims. (Cl. 117—212)

The present invention relates to plating techniques and, more specifically, to a novel process for plating dielectric materials.

To apply a metallic layer to dielectric materials, a chemical deposition process must be resorted to in that the insulating properties of materials of this class preclude the use of conventional electro-plating techniques. While chemical deposition techniques have heretofore been employed for the purpose of "metalizing" dielectric substrate members, there is a considerable area open for improving the quality of the deposited metallic layer.

The adhesion of the deposited metal to the dielectric substrate is purely a physical bond and any "keying" action between the surface of the substrate and the deposited layer obviously improves the adhesion of the deposited layer to the substrate. For any dielectric substrate surface area, consequently, the adhesion of the deposited layer may be vastly improved by insuring that all small pores, gouges, ridges, etc., present upon the surface areas be thoroughly wet by the various solutions employed and that the solutions be constantly replenished at the substrate by agitation. If it is desired to plate the sides of small diameter perforations in dielectric substrate members, this problem is compounded by solution interfacial tension and surface tension which prevents a complete flow of the solution through the small holes.

A simplified flow diagram of the novel process of this invention for plating dielectric materials is as follows:

| |
|---|
| Panel of dielectric material |
| \| |
| Immerse panel of dielectric material in conditioning bath or baths, as required |
| \| |
| Ultrasonically agitate the bath or baths while the panel is immersed therein |
| \| |
| Immerse conditioned panel in plating bath |

It is, therefore, an object of this invention to provide an improved process for depositing a conductor metal layer upon a panel of dielectric material.

It is another object of this invention to provide an improved process for plating the sides of holes in a panel of dielectric material.

In accordance with this invention, an improved process for applying a conductor metal layer to a panel of dielectric material is provided wherein the various bath solutions, into which the dielectric material panel is immersed during the plating process, are agitated ultrasonically during the time of immersion, resulting in a more complete penetration of the bath solutions through any orifices or holes through the panel or into any small pores or interstices present upon the panel surface area.

For a better understanding of the present invention, together with further objects, advantages, and features thereof, reference is made to the following description which sets forth two embodiments of the present invention.

Without intention or inference of a limitation thereto, the practice of the process of this invention will be described in regard to the chemical deposition of a metallic layer upon the surface areas of a panel of dielectric substrate material.

The surface areas of the dielectric material panel upon which a conductor metal is to be chemically deposited may be prepared in the same manner as with conventional chemical deposition methods. That is, the surface areas are thoroughly cleaned and slightly roughened by using abrasive type cleaners and scratch brushing. This provides small abrasions, in addition to the natural pores and interstices present in the surface areas of the dielectric material, to which the deposited metal conductive layer may adhere or "key."

After the surface to be plated has been thoroughly cleaned, the panel is immersed in a sensitizing bath comprised of an aqueous solution of a suitable metallic salt which is adsorbed over the surface area. In a practical application of the process of this invention, the sensitizing bath was comprised of a solution of two liters of water into which were dissolved 4 grams of stannous chloride and 2 cubic centimeters of hydrochloric acid. To effect a more complete penetration of the sensitizing solution into the small pores and interstices present upon the panel surfaces thereby insuring a more intimate contact of the sensitizing solution with the interior surface areas thereof and to frequently replenish the solution presented to these surface areas, the sensitizing bath is agitated ultrasonically at a frequency selected from the range of 20 to 400 kilocycles. This ultrasonic frequency may be provided by any of the commercially available ultrasonic generators acting through a suitable transducer element which is also commercially available. In a practical application of the process of this invention, a model GU720 ultrasonic generator manufactured by the "General Ultrasonics Company," now Acoustica Associates, Inc., was employed.

The panel is then removed from the sensitizing bath and the unadsorbed sensitizing solution is washed from the panel. Depending upon the type metal which is to be used as the conductor metal layer, the panel may or may not be now subjected to an activating bath which is comprised of an aqueous solution of a salt of another metal. For example, palladium or gold chloride may be used for the activating batch. If silver has been selected to be the conductor metal, the activating bath is not required as the silver may be chemically deposited directly to the sensitized surface. However, should copper be selected to be the conductor metal, the activating bath is necessary. Assuming, for purposes of this description, that the selected conductor metal be copper, the panel is then immersed in an activating bath during which the activating solution is also agitated ultrasonically. Again, this ultrasonic agitation during the activating bath effects a more complete penetration of the activating solution into the small pores and interstices present upon the panel surfaces and insures a more intimate contact of the activating solution with the interior surface areas thereof and frequently replenishes the solution presented to these surface areas.

The sensitizing material which had previously been adsorbed over the surface area of the panel acts as a reducing agent which reduces metallic palladium or gold out of solution, depending upon which salt has been employed, which is deposited upon the surface area of the dielectric panel. In a practical application of the present invention, a palladium chloride solution was employed for the activating bath and consisted of a solution of two liters of water into which were dissolved .1 gram of palladium chloride and 2 cubic centimeters of hydrochloric acid.

After the panel has been activated, it is then immersed in a coppering solution. This is, of course, a well-known process, using no external electrical power, wherein the conductor metal, in this instance copper, is reduced out of solution and chemically deposited upon the activated surface area of the dielectric panel. In a practical application of the process of the present invention, the copper solution was prepared by adding 50 cubic centimeters of a copper sulphate solution, 50 cubic centimeters of a sodium potassium tartrate, sodium hydroxide solution, and 20 cubic centimeters of commercial grade formalin to 1 liter of distilled water.

It was found that with the use of ultrasonic agitation during the sensitizing and activating baths, an improved metallic layer with better adhesion properties was realized with a much weaker coppering solution. The benefit derived from the weaker solution is the reduced tendency to spontaneously decompose and break down during the plating process.

The unique process of the present invention has just been described relative to plating both surface areas of a panel of dielectric material. In the event it should be required that only one surface area or only select portions of the surface areas be plated, those areas which are not to be plated may be covered by a protective material, such as lacquer for example, before the initial bath. Upon completion of the process, this protective material coating, along with the metallic layer deposited thereon, may be easily removed.

As has previously been pointed out, should silver be selected to be the conductor metal to be deposited, the activating bath would not be required. However, should nickel be selected to be the conductor metal to be deposited, the activating bath but not the sensitizing bath may be satisfactory. In any event, the essence of the present invention is the ultrasonic vibration of the sensitizing bath, the activating bath or both baths, if required, during the time of immersion of the panel to effect a more complete penetration of these solutions into the small pores and interstices present upon the surface area or areas of the panel thereby providing a more intimate contact of this solution with the small surface areas thereof and to constantly rapidly replenish the solution presented to these surfaces.

Another application of the process of this invention is in the production of electrical circuit units of the type having a conductive metallic pattern located upon respective opposing surfaces of a panel of dielectric material. To provide electrical interconnections between the two electrical circuit conductive patterns, each of which is located upon a respective opposing surface, the panel may be perforated at those points where electrical interconnections between the conductive patterns are to be provided. To avoid the use of mechanical eyelets for effecting this interconnection, these perforations are frequently plated through with a conductor metal. While this embodiment of the present invention will now be described in reference to the production of the electrical circuit units of this type, it is to be specifically understood that the description of the use of the process of this invention in this regard is illustrative only and is not to be interpreted as restricted or limited thereto.

After an electrical circuit unit of this type has been prepared by any one of several conventional methods well known in the "printed circuit" art, the panel may be covered with a coating of protective material such as lacquer, for example, and perforated at those points where electrical interconnections between the conductive patterns are to be provided. The protective coating prevents the chemical deposition of conductor metal except through the interior surface areas of the perforations.

The perforated panel is then immersed in a sensitizing bath comprised of an aqueous solution of a metallic salt for sensitizing the interior surface areas of the holes. This bath may be a solution of stannous chloride as previously described, for example, which is adsorbed over the interior surface areas of the holes. To effect a complete penetration of the stannous chloride solution through the holes, the bath is agitated ultrasonically at a frequency selected from the range of 20 to 400 kilocycles.

The panel is then removed from the sensitizing bath and the unadsorbed sensitizing solution is washed from the panel. The panel is then immersed in an activating bath comprised of an aqueous solution of a salt of another metal, palladium or gold chloride as previously described, for example. The adsorbed stannous chloride acts as a reducing agent which causes metallic palladium or gold to be reduced out of solution so that, in effect, the interior surfaces of the holes are "seeded" with palladium or gold. During this bath, the solution is also agitated ultrasonically for effecting a more complete penetration of the activating solution through the perforations thereby providing a more intimate contact between the solution and the interior surface areas of the holes.

The panel is then immersed in a copper salt solution and a reducing agent, similar to that previously described, to plate the interior surface of the holes by chemical deposition. This is, of course, a well-known process, using no external electrical power wherein the conductor metal, in this instance copper, is reduced out of solution and chemically deposited upon the sensitized and activated interior surfaces of the perforations.

For the purpose of reinforcing the chemically deposited copper through the perforations, additional copper may be deposited by an electroplating process. The protective coating may then be removed and the circuit unit completed in a conventional manner.

By using the above-described process, excellent results were achieved in plating through perforations of only .013 of an inch in diameter pierced through a sheet of "epoxy glass," a glass fabric impregnated with an epoxy resin, of a thickness of $\frac{1}{32}$ of an inch. In fact, plating was effected satisfactorily through perforations of .005 of an inch in diameter through similar material.

While two embodiments of the present invention have been described, it is specifically understood that various modifications and substitutions may be made without departing from the spirit of the invention which is to be limited only within the scope of the appended claims.

What is claimed is:

1. A process for plating through perforations in a panel of dielectric material having a conductive metallic pattern upon respective opposite surfaces thereof to provide an electrical connection therethrough comprising the steps of applying a coating of protective material to both panel surfaces, perforating the panel with holes as small as .005 inch in diameter at those points through which plating is to be effected, immersing the panel in a sensitizing bath comprised of an aqueous solution of a metallic salt for sensitizing the interior surface areas of the perforations, agitating the sensitizing bath solution ultrasonically during panel immersion, immersing the panel in an activating bath comprised of an aqueous solution of a salt of another metal for activating the sensitized interior surface areas of the perforations, agitating the activating bath solution ultrasonically during panel immersion and immersing the panel in an aqueous solution of a salt of a conductoir metal and a reducing agent whereby the conductor metal is reduced out of solution and chemically deposited through said perforations to provide electrical connection between said conductive metallic patterns upon respective opposite surfaces of said panel.

2. A process for plating through perforations in a panel of dielectric material having a conductive metallic pattern upon respective opposite surfaces thereof to provide an electrical connection therethrough comprising the steps of applying a coating of protective material to both panel surfaces, perforating the panel with holes as small as .005 inch in diameter at those points through which plating is to be effected, immersing the panel in a sensitizing bath comprised of an aqueous solution of stannous chloride for sensitizing the interior surface areas of the perforations, agitating the sensitizing bath solution ultrasonically during panel immersion, immersing the panel in an activating bath comprised of an aqueous solution of palladium chloride for activating the sensitized interior surface areas of the perforations, agitating the activating bath solution ultrasonically during panel immersion and immersing the panel in an aqueous solution of a salt of a conductor metal and a reducing agent whereby the conductor metal is reduced out of solution and chemically deposited through said perforations to provide electrical connection between said conductive metallic patterns upon respective opposite surfaces of said panel.

3. A process for plating through perforations in a panel of dielectric material having a conductive metallic pattern upon respective opposite surfaces thereof to provide an electrical connection therethrough comprising the steps of applying a coating of protective material to both panel surfaces, perforating the panel with holes as small as .005 inch in diameter at those points through which plating is to be effected, immersing the panel in a sensitizing bath comprised of an aqueous solution of stannous chloride for sensitizing the interior surface areas of the perforations, agitating the sensitizing bath solution ultrasonically during panel immersion, immersing the panel in an activating bath comprised of an aqueous solution of gold chloride for activating the sensitized interior surface areas of the perforations, agitating the activating bath solution ultrasonically during panel immersion, immersing the panel in an aqueous solution of a salt of a conductor metal and a reducing agent whereby the conductor metal is reduced out of solution and chemically deposited through said perforations to provide electrical connection between said conductive metallic patterns upon respective opposite surfaces of said panel, removing the coating of protective material, and applying circuitry interconnecting the plated-through holes.

4. A process for plating through perforations in a panel of dielectric material having a conductive metallic pattern upon respective opposite surfaces thereof to provide an electrical connection therethrough comprising the steps of applying a coating of protective material to both panel surfaces, perforating the panel with holes as small as .005 inch in diameter at those points through which plating is to be effected, immersing the panel in a sensitizing bath comprised of an aqueous solution of a metallic salt for sensitizing the interior surface areas of the perforations, agitating the sensitizing bath solution ultrasonically during panel immersion and immersing the panel in an aqueous solution of a silver salt and a reducing agent whereby silver metal is reduced out of solution and chemically deposited through said perforations to provide electrical connection between said conductive metallic patterns upon respective opposite surfaces of said panel.

5. A process for plating through perforations in a panel of dielectric material having a conductive metallic pattern upon respective opposite surfaces thereof to provide an electrical connection therethrough comprising the steps of applying a coating of protective material to both panel surfaces, perforating the panel with holes as small as .005 inch in diameter at those points through which plating is to be effected, immersing the panel in a sensitizing bath comprised of an aqueous solution of a metallic salt for sensitizing the interior surface areas of the perforations, agitating the sensitizing bath solution ultrasonically during panel immersion and immersing the panel in an aqueous solution of a salt of a conductor metal and a reducing agent whereby the conductor metal is reduced out of solution and chemically deposited through said perforations to provide electrical connection between said conductive metallic patterns upon respective opposite surfaces of said panel.

References Cited by the Examiner

UNITED STATES PATENTS

| | | | |
|---|---|---|---|
| 2,397,400 | 3/46 | Barwich | 117—113 |
| 2,454,610 | 11/48 | Narcus | 117—47 |
| 2,616,994 | 11/52 | Luhn | 200—11 |
| 2,657,667 | 11/53 | Maier | 118—612 |
| 2,699,425 | 1/55 | Niester | 204—18 |
| 2,702,260 | 2/55 | Massa | 134—1 |
| 2,955,958 | 10/60 | Brown | 117—113 |

FOREIGN PATENTS 760,684 11/56 Great Britain.

RICHARD D. NEVIUS, *Primary Examiner.*